United States Patent
Fischer et al.

(10) Patent No.: US 12,158,244 B2
(45) Date of Patent: Dec. 3, 2024

(54) DEVICE AND METHOD FOR FILLING PRESSURIZED GAS TANKS

(71) Applicant: L'Air Liquide, Societe Anonyme pour l'Etude et l'Exploitation des Procedes Georges Claude, Paris (FR)

(72) Inventors: Benjamin Fischer, Jouy-en-Josas (FR); Herve Paoli, Jouy-en-Josas (FR)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 105 days.

(21) Appl. No.: 17/918,065

(22) PCT Filed: Mar. 23, 2021

(86) PCT No.: PCT/EP2021/057390
§ 371 (c)(1),
(2) Date: Oct. 10, 2022

(87) PCT Pub. No.: WO2021/204527
PCT Pub. Date: Oct. 14, 2021

(65) Prior Publication Data
US 2023/0160528 A1     May 25, 2023

(30) Foreign Application Priority Data
Apr. 10, 2020 (FR) .................................... 2003617

(51) Int. Cl.
*F17C 5/00* (2006.01)
*G05D 16/20* (2006.01)

(52) U.S. Cl.
CPC ........... *F17C 5/002* (2013.01); *G05D 16/204* (2013.01); *F17C 2205/0142* (2013.01);
(Continued)

(58) Field of Classification Search
CPC ........ F17C 2221/012; F17C 2205/0352; F17C 2205/0326; F17C 2205/0142
See application file for complete search history.

(56) References Cited

U.S. PATENT DOCUMENTS

| 5,406,988 A | 4/1995 | Hopkins |
| 8,156,970 B2 * | 4/2012 | Farese ...................... F17C 5/06 141/94 |

(Continued)

FOREIGN PATENT DOCUMENTS

FR     3 067 095     12/2018

OTHER PUBLICATIONS

International Search Report and Written Report for PCT/EP2021/057390, mailed Jun. 1, 2021.
French Search Report for FR 2003617, mailed Dec. 1, 2020.

*Primary Examiner* — Timothy L Maust
(74) *Attorney, Agent, or Firm* — Elwood L. Haynes

(57) ABSTRACT

A device for filling pressurized gas tanks, including a fluid transfer circuit having an upstream end connected to a plurality of sources of pressurized fluid and a downstream end having at least one dispenser intended to be connected to a tank to be filled, the sources being connected in parallel, each source has a fluid outlet connected to a respective outlet valve, the transfer lines being connected in parallel to the at least one dispenser and each having a respective transfer valve, the transfer lines and the transfer valves being dimensioned so as to transfer a maximum transfer gas flow which is smaller than the maximum filling gas flow, the sum of a plurality of maximum transfer gas flows provided by a plurality of outlet valves and a plurality of transfer lines being greater than or equal to the maximum filling gas flow.

11 Claims, 2 Drawing Sheets

(52) U.S. Cl.
CPC ............. *F17C 2205/0326* (2013.01); *F17C 2205/0352* (2013.01); *F17C 2221/012* (2013.01); *F17C 2265/065* (2013.01)

(56) References Cited

U.S. PATENT DOCUMENTS

| | | |
|---|---|---|
| 11,286,925 B2 * | 3/2022 | Blankemeier ............ F04C 28/28 |
| 2009/0236006 A1 | 9/2009 | Farese et al. |
| 2013/0008557 A1 | 1/2013 | Cohen |
| 2018/0080608 A1 | 3/2018 | Reddi et al. |
| 2018/0347758 A1 | 12/2018 | Lacombe et al. |
| 2019/0178447 A1 * | 6/2019 | Poorman ............... F17C 13/025 |

* cited by examiner

[Fig. 1]
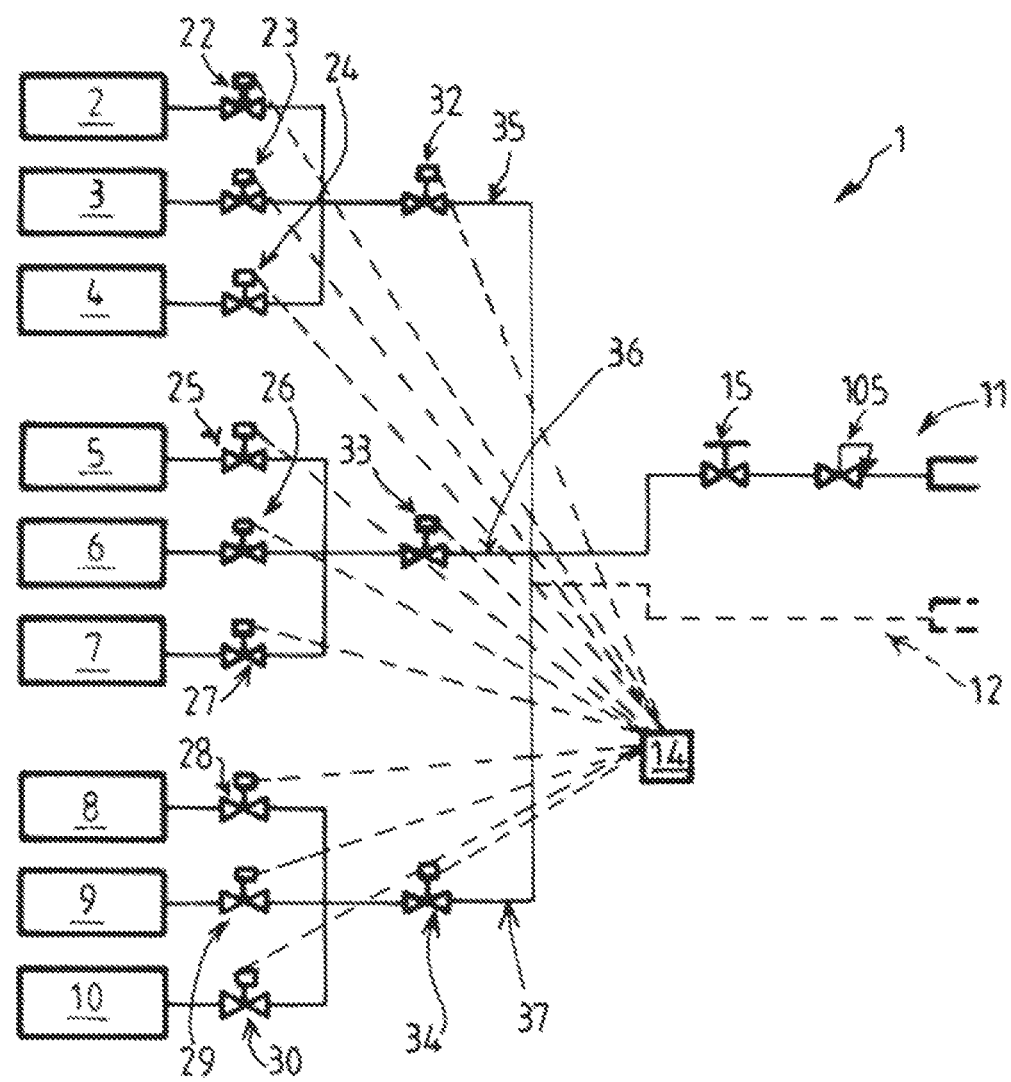

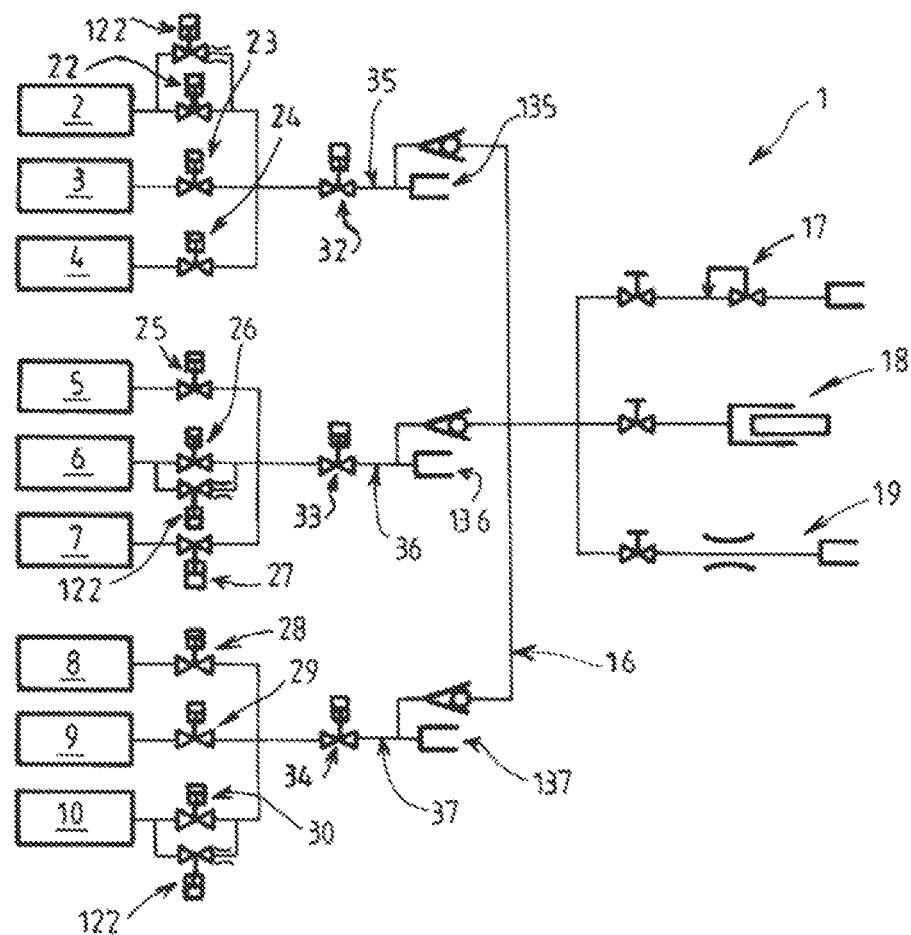
[Fig. 2]

DEVICE AND METHOD FOR FILLING PRESSURIZED GAS TANKS

CROSS-REFERENCE TO RELATED APPLICATIONS

This application is a § 371 of International PCT Application PCT/EP2021/057390, filed Mar. 23, 2021, which claims § 119(a) foreign priority to French patent application FR 2 003 617, filed Apr. 10, 2020.

BACKGROUND

Field of the Invention

The invention relates to a device and to a method for filling pressurized gas tanks.

More particularly, the invention relates to a device for filling pressurized gas tanks, in particular hydrogen tanks of vehicles, comprising a fluid transfer circuit with an upstream end connected to a plurality of pressurized fluid sources and a downstream end comprising at least one dispenser intended to be connected to a tank to be filled, the sources being connected in parallel to the at least one dispenser.

Related Art

High-pressure hydrogen storage vehicles are used to supply the various filling stations. In order to supply the stations under optimum conditions, the storage units in these vehicles may be evacuated using the cascade principle.

Known solutions ensure the filling of tanks from a pressurized gas source by controlling the gas transfer speed and acting on the load loss in the circuit. This may be achieved using a set of several valves in parallel in order to adjust the flow rate.

In certain cases, the transfer flow rates must be high and the equipment available on the market does not allow the provision of circuits compatible with these flow rates.

SUMMARY OF THE INVENTION

An object of the present invention is to overcome all or some of the drawbacks of the prior art noted above.

To this end, the device according to the invention, which otherwise conforms to the generic definition given in the preamble above, is essentially characterized in that each source comprises a fluid outlet connected to a respective outlet valve, the sources being connected in parallel in different subgroups to respective transfer lines, i.e. all the sources of a same subgroup are connected in parallel to a dedicated transfer line, each of several subgroups and preferably all subgroups of sources comprising multiple sources, the transfer lines being connected in parallel to the at least one dispenser and each comprising a respective transfer valve, the at least one dispenser comprising a set of control valve(s), the at least one dispenser and its set of control valve(s) being dimensioned so as to transfer a predetermined maximum filling gas flow, the outlet valves, the transfer lines and the transfer valves being dimensioned so as to transfer a maximum transfer gas flow which is smaller than the maximum filling gas flow, the sum of a plurality of maximum transfer gas flows provided by a plurality of outlet valves and a plurality of transfer lines being greater than or equal to the maximum filling gas flow.

Furthermore, embodiments of the invention may have one or more of the following features:

- the subgroups of sources each comprise two, three or more than three sources connected in parallel to a dedicated transfer line,
- the device comprises two, three or more than three subgroups of sources,
- the flow coefficient of the set of control valve(s) of the at least one dispenser is between 3 and 6, and preferably equal to 4.5, the flow coefficient of each outlet valve and of the transfer line valves being between one and two, and preferably equal to 1.5,
- the device comprises a plurality of dispensers connected in parallel to transfer lines via independent lines allowing the simultaneous transfer of gas into the dispensers from identical or different sources and at identical or different pressures or flow rates,
- at least some of the valves are controlled valves, the device comprising an electronic element for data storage and processing, which is configured to control said controlled valves,
- the electronic element for data storage and processing is configured to control the opening and closure of the valves in order to fill a tank connected to the at least one dispenser, by performing successive pressure balancing adjustments between the sources and the tank to be filled using the cascade principle,
- the electronic element for data storage and processing is configured to perform successive pressure balancing adjustments between the sources and the tank to be filled using the cascade principle, with the sources of a same subgroup or sources of different subgroups,
- the electronic element for data storage and processing is configured to transfer to the tank a predetermined reference gas flow, which is greater than the maximum transfer gas flow of each outlet valve and each transfer line, by performing simultaneous pressure balancing adjustments between a plurality of sources and the tank,
- the electronic element for data storage and processing is configured to perform simultaneous pressure balancing adjustments between a plurality of sources belonging to different subgroups on one side and the tank on the other.

The invention also concerns a method for filling at least one pressurized gas tank, in particular at least one hydrogen tank of a vehicle, using a device with any of the features described above or below, the method comprising pressure balancing adjustments between the sources and the tank to be filled.

According to other possible particular features:

- the method comprises a step of transferring to the at least one tank a predetermined reference gas flow which is greater than the maximum transfer gas flow of each outlet valve and each transfer line, said reference gas flow being obtained by cumulation of the gas flows provided simultaneously by a plurality of sources belonging to identical or different subgroups,
- the method comprising a step of transferring to the at least one tank a predetermined reference gas flow which is greater than the maximum transfer gas flow of each outlet valve and each transfer line, said reference gas flow being obtained by cumulation of the gas flows provided simultaneously by two, three or more than three sources belonging to identical or different subgroups.

The invention may also relate to any alternative device or method comprising any combination of the features above or below within the scope of the claims.

BRIEF DESCRIPTION OF THE FIGURES

Further particular features and advantages will become apparent on reading the description below, made with reference to the figures, in which:

FIG. 1 shows a schematic and partial view illustrating the structure and the operation of a filling device according to a first exemplary embodiment of the invention, FIG. 2 shows a schematic and partial view illustrating the structure and the operation of a filling device according to a second exemplary embodiment of the invention.

DETAILED DESCRIPTION OF THE INVENTION

The device 1 shown for filling pressurized gas tanks comprises a fluid transfer circuit having an upstream end connected to a plurality of sources 2 to 10 of pressurized fluid. These sources 2 to 10 may comprise for example high-pressure gas storage units (for example between 150 and 1000 bar). These storage units may in particular be mobile, for example mounted on a same semitrailer or different semitrailers.

The circuit comprises at least one dispenser intended to be connected to a tank to be filled, for example via a nozzle on a quick-release coupling. In the example of FIG. 1, the device comprises two dispensers 11, 12, one of which 12 is depicted symbolically in dotted lines. A single dispenser (or more than two, in particular three) is also conceivable. The dispensers 11, 12 may comprise at least one of: a flap or valve 15, a pressure relief valve and/or flow regulator 105, a quick-release coupling.

The sources 2 to 10 are connected in parallel to dispensers 11, 12 via appropriate pipes. Each source 2 to 10 comprises a fluid outlet connected to at least one respective outlet valve 22 to 30. It should be noted that, for the sake of simplicity, the apertures of each source and its associated valve are denoted below by the adjective "outlet". Evidently, this outlet aperture and this associated outlet valve may be used, if necessary, for the admission of fluid when the source has to be refilled (notably if the source has no different filling aperture).

The sources 2 to 10 are connected in parallel, in different subgroups, to respective transfer lines 35 to 37. In other words, all sources of a same subgroup are connected in parallel to a dedicated transfer line 35 to 37. Preferably, the subgroups of sources are each composed of a plurality of sources. In these non-limitative examples, the device comprises nine sources divided into three subgroups, respectively connected to three transfer lines 35 to 37. Naturally, the device 1 may comprise more or fewer than nine sources divided into more or fewer subgroups.

Further downstream (in the direction of dispensers 11, 12), the transfer lines 35 to 37 are connected in parallel to dispensers 11, 12, 13.

As illustrated, preferably each transfer line 35 to 37 comprises at least one respective transfer valve 32 to 34. Further downstream, the dispensers 11, 12, 13 may comprise a set of control valve(s), for example at least one fluidic element(s) amongst: a valve (preferably controlled), a flow and/or pressure regulator, a flexible portion, a quick-release coupling, a nozzle.

The dispensers 11, 12, 13 and associated elements (valve(s) etc.) are dimensioned to allow a predetermined maximum filling gas flow which may be a relatively high flow rate, for example of the order of 1000 kg/h (whereas for the transfer lines, the flow may be of the order of two to ten times smaller, in particular five times smaller).

This may be necessary in particular for transferring relatively large flows into high-capacity tanks, in particular tanks of trucks or trains.

Preferably, all or part of the circuit upstream of the dispensers 11, 12, 13 is dimensioned for transferring a maximum transfer gas flow which is smaller than this maximum filling gas flow. In other words, the outlet valves 22 to 30, the transfer lines 35 to 37, and the respective transfer valves 32 to 34 (and the pipes connecting the outlet valves to the transfer lines) may be under-dimensioned, for a maximum transfer gas flow which is smaller than the maximum filling gas flow.

However, the sum of several maximum transfer gas flows supplied by several outlet valves 22 to 30 and several transfer lines 35 to 37 is configured to be greater than or equal to the maximum filling gas flow. In other words, this maximum filling gas flow may be achieved using several sources and corresponding transfer lines simultaneously.

Thus by associating sources 2 to 10 and combining them where required, it is possible to supply the dispensers 11, 12, 13 just as well with relatively small flows as with relatively large flows, without the entire circuit having to be dimensioned for the second case (large flow). This reduces the cost and constraints of production of the circuit without limiting the possible applications. For example, the upstream pipes, lines and valves may have diameters or flow coefficients (Cv) of 1.5, instead of valves or pipes with larger diameters or flow coefficients Cv of 4.5 (these greater dimensions being reserved for the dispensers 11, 12, 13).

In particular, this allows the use of smaller lines, pipes, hoses and valves.

Said predetermined maximum gas flows may be defined by at least one of: the gas passage diameter (cross-section), the passage coefficient (Cv) in the defined portion of the circuit, or any other flow limiting element.

Thus, under all otherwise equal conditions (pressure, speed etc.), said maximum flows may be defined by the internal diameters of the abovementioned dispensers, valves and/or line portion(s).

For example, in the case of a maximum speed in the pipelines of 100 m/2, a supply pressure of 635 bar, and three dispensers (hoses) of 10 mm internal diameter, it is theoretically possible to obtain flow rates of the order of 3500 Nm3/h per hose independently, or around 11,000 Nm3/h in total (three hoses).

To obtain the same flow with the same hypotheses on a conventional installation (single hose), it would be necessary to have a hose with an internal diameter of 17.5 mm.

This is however a non-limiting example. In fact, using hoses of larger diameter (for example, three hoses of 12 mm diameter, equivalent to a diameter of 21 mm, allowing the transfer of 3×5000 Nm3/h), the benefit is even greater as it is indexed on the passage cross-section and therefore increases in proportion to the square of the diameter.

Naturally, two, four or any number of dispensers (hoses) may be provided in addition to this non-limitative example.

In order to supply a high flow (for example, the maximum filling gas flow), the gas may be supplied simultaneously by two, three or more than three sources belonging for example to three subgroups. For example, depending on the pressure in the sources, the first sources 2, 5, 8 (in order from top to bottom on the drawings) may be used simultaneously to provide a large flow. Alternatively, the second sources 3, 6, 9 (or the last three sources 4, 7, 10) of the three subgroups may be associated simultaneously.

In order to provide smaller flows, other associations of sources may be considered, depending on the downstream flow required and the pressures in the sources.

All possible combinations may be considered.

The device allows the fastest possible transfer of a large quantity of gas between the sources and a dispenser serving to fill the downstream tank.

Sources 2 to 10 may be used sequentially with increasing pressures in order to always maximize the pressure difference between the source used and the tank to be filled.

The groupings of sources used depend on the pressure in each of the sources. The transfers are thus performed while limiting the generation of cold in one of the sections under the Joules Thomson effect (large extraction flows are accompanied by great pressure variations in the sections, which generates cold).

Preferably, when the device 1 comprises several dispensers 11, 12, 13, these are connected in parallel to the transfer lines 35 to 37 (via parallel pipes where appropriate) in order to allow the simultaneous and differentiated supply of several dispensers 11, 12, 13, possibly with different pressure levels.

Thus depending on pressures in the sources, the subgroups may be rearranged by associating different subgroup sources. These rearranged subgroups are composed for example of three sources.

Preferably, all or some of the valves are controlled valves, wherein the device 1 may comprise or be associated with an electronic element 14 for data storage and processing (comprising a calculator, computer or microprocessor) which is configured to control said controlled valves.

This electronic element 14 may in particular be configured to control the opening and closure of the valves in order to fill a tank connected to the at least one dispenser 11, 12, 13, by performing in succession optimal pressure balancing adjustments between the sources and the tank to be filled using the cascade principle.

As illustrated in FIG. 2, at least one of the sources of each subgroup may be provided with a line 122 bypassing the outlet valve and comprising a valve and a flow restriction. This allows a progressive pressure increase downstream when this source has too great a pressure difference from downstream.

Furthermore, transfer lines 35 to 37 may be connected in parallel to a common balancing pipe 16 by respective check valves. Connecting lines 17, 18 and 19 may be connected in parallel to this balancing pipe 16. These connecting lines 17, 18, 19 may be equipped with flaps, valves, restrictions or pressure relief devices upstream of the connecting couplings. This allows performance of the functions of gas analysis, pressure reduction and purging of pipelines.

As illustrated, connectors 135, 136, 137 may be provided at the end of each of the transfer lines 35 to 37 in order to be connected to the dispensers 11, 12, 13 (for example, independently or in parallel, as in the embodiment of FIG. 1).

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for filling pressurized gas tanks, comprising a fluid transfer circuit having an upstream end connected to a plurality of sources of pressurized fluid and a downstream end comprising at least one dispenser configured to be connected to a pressurized gas tank to be filled, wherein:

the plurality of sources are connected in parallel to the at least one dispenser;

each of the plurality of sources comprises a fluid outlet connected to a respective outlet valve;

the plurality of sources are divided into a plurality of subgroups;

at least two of the subgroups comprising multiple ones of the plurality of sources;

for each subgroup, each of the sources associated therewith are connected in parallel to a respective transfer line;

each of the transfer lines are connected in parallel to the at least one dispenser and comprising a respective transfer valve;

the at least one dispenser comprising a set of control valves, the at least one dispenser and its set of control valves being dimensioned so as to transfer an associated predetermined maximum filling gas flow;

the outlet valves, the transfer lines, and the transfer valves are dimensioned so as to transfer a maximum transfer gas flow therethrough;

the maximum transfer gas flow is smaller than predetermined maximum filling gas flow; and a sum of the maximum transfer gas flows provided by each of the outlet valves and transfer valves is greater than or equal to the predetermined maximum filling gas flow.

2. The filling device of claim 1, wherein the maximum transfer gas flows from the plurality of sources are limited via at least one of: a gas passage diameter (cross-section) of the associated fluid outlet or outlet valve and a passage coefficient (Cv) of the associated fluid outlet or outlet valve.

3. The device of claim 1, wherein each of the subgroups comprising multiple ones of the plurality of sources connected in parallel to the associated respective transfer line.

4. The device of claim 1, wherein plurality of subgroups comprises three or more subgroups.

5. The device of claim 1, wherein a flow coefficient of the set of control valves of the at least one dispenser is between three and six and a flow coefficient of each outlet valve and respective transfer line valve is between one and two.

6. The device of claim 5, wherein flow coefficient of the set of control valves of the at least one dispenser is equal to 4.5.

7. The device of claim 5, wherein flow coefficient of each outlet valve and respective transfer line valve is equal to 1.5.

8. The device of claim 1, wherein the at least one dispenser comprises a plurality of dispensers that are connected in parallel to the plurality of transfer lines via independent lines so as to allow simultaneous transfer of pressurized gas into the plurality of dispensers from identical or different ones of the plurality of sources and at identical or different pressures or flow rates.

9. A method for filling at least one pressurized hydrogen tank of a vehicle, comprising the steps of:
   providing the device of claim 1; and
   performing pressure balancing adjustments between the plurality of sources and the at least one tank.

10. The method of claim 9, further comprising a step of transferring, to the at least one tank, a predetermined reference gas flow which is greater than a maximum transfer gas flow of each outlet valve and each transfer line, the reference gas flow being obtained by summing up flows of the pressurized hydrogen that are provided simultaneously by the plurality of sources, wherein two or more of the plurality of sources simultaneously providing flows of pressurized hydrogen belong to a same subgroup.

11. The method of claim 9, further comprising a step of transferring, to the at least one tank, a predetermined reference gas flow which is greater than a maximum transfer gas flow of each outlet valve and each transfer line, the reference gas flow being obtained by summing up flows of the pressurized hydrogen that are provided simultaneously by the plurality of sources, wherein two or more of the plurality of sources simultaneously providing flows of pressurized hydrogen belong to different subgroups.

* * * * *